(12) United States Patent (10) Patent No.: US 10,043,067 B2
Zhang et al. (45) Date of Patent: Aug. 7, 2018

(54) SYSTEM AND METHOD FOR DETECTING PEDESTRIANS USING A SINGLE NORMAL CAMERA

(71) Applicant: Harman International Industries, Incorporated, Stamford, CT (US)

(72) Inventors: Yankun Zhang, Shanghai (CN); Chuyang Hong, Shanghai (CN); Ruyi Jiang, Shanghai (CN); Yun Zhou, Shanghai (CN); Norman Weyrich, Shanghai (CN)

(73) Assignee: Harman International Industries, Incorporated, Stamford, CT (US)

( * ) Notice: Subject to any disclaimer, the term of this patent is extended or adjusted under 35 U.S.C. 154(b) by 239 days.

(21) Appl. No.: 14/648,893

(22) PCT Filed: Dec. 3, 2012

(86) PCT No.: PCT/CN2012/085727
§ 371 (c)(1),
(2) Date: Jun. 1, 2015

(87) PCT Pub. No.: WO2014/085953
PCT Pub. Date: Jun. 12, 2014

(65) Prior Publication Data
US 2015/0332089 A1 Nov. 19, 2015

(51) Int. Cl.
*G06K 9/00* (2006.01)
*G06T 3/00* (2006.01)
(Continued)

(52) U.S. Cl.
CPC ..... *G06K 9/00369* (2013.01); *G06K 9/00805* (2013.01); *G06K 9/52* (2013.01);
(Continued)

(58) Field of Classification Search
CPC ...... H04N 5/23293; H04N 5/357; G06T 3/00; G06T 5/006; G06T 7/60; G06K 9/00369; G06K 9/00805; G06K 9/52
See application file for complete search history.

(56) References Cited

U.S. PATENT DOCUMENTS 6,122,597 A * 9/2000 Saneyoshi ............... G06T 7/11
348/E13.014
6,327,522 B1 * 12/2001 Kojima ................. B60K 35/00
348/115

(Continued)

FOREIGN PATENT DOCUMENTS

| CN | 101959060 A | 1/2011 |
|---|---|---|
| CN | 102103747 A | 6/2011 |
| JP | 2010193170 A | 9/2010 |

OTHER PUBLICATIONS

D. Varga, T. Szirányi, A. Kiss, L. Spórás, and L. Havasi. A Multi-View Pedestrian Tracking Method in an Uncalibrated Camera Network. Proceedings of the IEEE International Conference on Computer Vision Workshops, 37-44, 2015.*
(Continued)

*Primary Examiner* — Iman K Kholdebarin
(74) *Attorney, Agent, or Firm* — McCoy Russell LLP

(57) ABSTRACT

The present application provides pedestrian detection system and method. A pedestrian detection method includes obtaining an image captured by a camera, and identifying a pedestrian candidate in the image. According to the method, the pedestrian candidate is confirmed by transforming the image into a top view image, calculating the actual height of the pedestrian candidate based on the top view image and extrinsic parameters of the camera, and determining whether the actual height of the pedestrian candidate is within a predetermined pedestrian height range.

20 Claims, 6 Drawing Sheets

(51) Int. Cl.
*G06K 9/52* (2006.01)
*G06T 5/00* (2006.01)
*H04N 5/357* (2011.01)
*H04N 5/232* (2006.01)
*G06T 7/60* (2017.01)
*G06K 9/36* (2006.01)

(52) U.S. Cl.
CPC .............. *G06T 3/00* (2013.01); *G06T 5/006* (2013.01); *G06T 7/60* (2013.01); *H04N 5/23293* (2013.01); *H04N 5/357* (2013.01); *G06K 2009/363* (2013.01); *G06T 2207/30196* (2013.01); *G06T 2207/30252* (2013.01)

(56) References Cited

U.S. PATENT DOCUMENTS

| | | | | |
|---|---|---|---|---|
| 7,388,476 B2* | 6/2008 | Nagaoka | | B60K 35/00 340/435 |
| 7,853,072 B2* | 12/2010 | Han | | G06K 9/4642 382/103 |
| 8,923,553 B2* | 12/2014 | Yashiro | | G06K 9/00369 382/103 |
| 8,942,511 B2* | 1/2015 | Yashiro | | G06K 9/3241 382/286 |
| 8,981,966 B2* | 3/2015 | Stein | | B60R 1/00 340/436 |
| 9,008,365 B2* | 4/2015 | Xu | | G06K 9/00369 382/103 |
| 9,111,147 B2* | 8/2015 | Thornton | | H04N 7/18 |
| 9,517,767 B1* | 12/2016 | Kentley | | B60N 2/002 |
| 2003/0138133 A1* | 7/2003 | Nagaoka | | G06K 9/00362 382/104 |
| 2004/0183906 A1* | 9/2004 | Nagaoka | | B60R 1/00 348/148 |
| 2004/0258279 A1* | 12/2004 | Hirvonen | | G06K 9/00201 382/104 |
| 2005/0063565 A1* | 3/2005 | Nagaoka | | B60R 21/013 382/104 |
| 2005/0196034 A1* | 9/2005 | Hattori | | B60R 1/00 382/154 |
| 2006/0126898 A1* | 6/2006 | Nagaoka | | B60K 35/00 382/103 |
| 2007/0047837 A1* | 3/2007 | Schwab | | G06K 9/00771 382/285 |
| 2007/0229238 A1* | 10/2007 | Boyles | | G06K 9/00369 340/435 |
| 2007/0237387 A1* | 10/2007 | Avidan | | G06K 9/00369 382/159 |
| 2009/0046093 A1* | 2/2009 | Kikuchi | | G01C 21/3638 345/419 |
| 2009/0103779 A1* | 4/2009 | Loehlein | | G06K 9/00369 382/103 |
| 2009/0225189 A1* | 9/2009 | Morin | | H04N 5/345 348/229.1 |
| 2011/0249030 A1* | 10/2011 | Hirose | | G01C 21/3638 345/650 |
| 2012/0050074 A1* | 3/2012 | Bechtel | | B60R 1/04 340/988 |
| 2012/0127312 A1* | 5/2012 | Nagamine | | B60R 1/00 348/148 |
| 2012/0182140 A1* | 7/2012 | Kumabe | | G08G 1/161 340/435 |
| 2012/0194680 A1* | 8/2012 | Ishii | | G06K 9/00362 348/148 |
| 2013/0182905 A1* | 7/2013 | Myers | | H04N 7/18 382/103 |
| 2013/0222592 A1* | 8/2013 | Gieseke | | G08G 1/04 348/148 |
| 2013/0251203 A1* | 9/2013 | Tanabiki | | G06K 9/00369 382/103 |
| 2013/0314503 A1* | 11/2013 | Nix | | G06K 9/00805 348/46 |
| 2013/0342694 A1* | 12/2013 | Friedhoff | | G06K 9/00791 348/148 |
| 2014/0063252 A1* | 3/2014 | Zhao | | G06T 7/80 348/148 |
| 2014/0072170 A1* | 3/2014 | Zhang | | G06K 9/00369 382/103 |
| 2014/0177946 A1* | 6/2014 | Lim | | G06K 9/4614 382/156 |
| 2014/0226855 A1* | 8/2014 | Savvides | | G06K 9/00771 382/103 |
| 2014/0270378 A1* | 9/2014 | Aimura | | G06K 9/00805 382/103 |
| 2014/0320658 A1* | 10/2014 | Pliefke | | B60R 1/002 348/148 |
| 2015/0086077 A1* | 3/2015 | Du | | G06K 9/00369 382/104 |
| 2015/0178556 A1* | 6/2015 | Perski | | G06K 9/00355 382/103 |
| 2015/0178571 A1* | 6/2015 | Zhang | | G06K 9/00369 382/103 |
| 2015/0234474 A1* | 8/2015 | Yokoyama | | G06F 1/26 713/323 |
| 2015/0317797 A1* | 11/2015 | Lu | | G06T 7/0081 382/103 |
| 2015/0332089 A1* | 11/2015 | Zhang | | G06T 7/60 382/104 |
| 2016/0086033 A1* | 3/2016 | Molin | | G06K 9/00671 345/419 |
| 2016/0283590 A1* | 9/2016 | Matsuda | | G06F 17/30793 |
| 2016/0292890 A1* | 10/2016 | Baek | | G06T 7/604 |
| 2016/0342830 A1* | 11/2016 | Ariizumi | | G06K 9/00335 |
| 2017/0158134 A1* | 6/2017 | Shigemura | | B60R 1/002 |

OTHER PUBLICATIONS

Goubet, E. "Pedestrian Tracking Using Thermal Infrared Imaging" SPIE Defense & Security Symposium May 2006.*

Dalal, N. et al., "Histograms of Oriented Gradients for Human Detection," IEEE Computer Society Conference on Computer Vision and Pattern Recognition, CVPR2005, vol. 1, Jun. 2005, 8 pages.

Enzweiler, M. et al., "Monocular Pedestrian Detection: Survey and Experiments," IEEE Transactions on Pattern Analysis and Machine Intelligence, vol. 31, No. 12, Dec. 2009, 17 pages.

Geronimo, D. et al., "Survey of Pedestrian Detection for Advanced Driver Assistance Systems," IEEE Transactions on Pattern Analysis and Machine Intelligence, vol. 32, No. 7, Jul. 2010, 20 pages.

Dollar, P., et al., "Pedestrian Detection: An Evaluation of the State of the Art," IEEE Transactions on Pattern Analysis and Machine Intelligence, vol. 34, No. 4, Aug. 2011, 20 pages.

ISA State Intellectual Property Office of the People's Republic of China, International Search Report Issued in International Application No. PCT/CN2012/085727, Sep. 12, 2013, WIPO, 2 pages.

Paisitkriangkrai, S. et al., "Fast Pedestrian Detection Using a Cascade of Boosted Covariance Features," IEEE Transactions on Circuits and Systems for Video Technology, vol. 18, No. 8, Aug. 2008, 12 pages.

Wu, J. et al., "Real-Time Human Detection Using Contour Cues," 2011 IEEE International Conference on Robotics and Automation (ICRA), May 2011, 8 pages.

Momeni-K., M. et al., "Height Estimation from a Single Camera View," Proceedings of the International Conference on Computer Vision Theory and Applications (VISIGRAPP 2012), Feb. 24, 2012, Rome, Italy, 7 pages.

Salih, Y. et al., "Depth and Geometry from a Single 2D Image Using Triangulation," Proceedings of the 2012 IEEE International Conference on Multimedia and Expo Workshops (ICMEW '12), Jul. 9, 2012, Melbourne, Australia, 5 pages.

European Patent Office, Extended European Search Report Issued in Application No. 12889460.7, dated Jul. 1, 2016, 6 pages.

* cited by examiner

SYSTEM AND METHOD FOR DETECTING PEDESTRIANS USING A SINGLE NORMAL CAMERA

CROSS REFERENCE TO RELATED APPLICATION

The present application is a U.S. National Phase of International Patent application Ser. No. PCT/CN2012/085727, entitled "SYSTEM AND METHOD FOR DETECTING PEDESTRIANS USING A SINGLE NORMAL CAMERA," and filed on Dec. 3, 2012, the entire contents of which are hereby incorporated by reference for all purposes.

TECHNICAL FIELD

The present application generally relates to system and method for detecting pedestrians using a single normal camera.

BACKGROUND

Various pedestrian detecting technologies have been developed, and have been used in vehicles to detect and remind a driver of pedestrians in the vicinity of a vehicle. Some solutions are based on radar, some solutions are based on multiple cameras, some solutions are based on laser, and some solutions are based on infrared cameras, but these solutions have a same drawback which is high cost. Although some conventional solutions using a single normal camera are low cost, these solutions produce many false positives in order to get high detection rate. Examples of such solutions please see N. Dalal and B. Triggs, "*Histograms of Oriented Gradients for Human Detection*", CVPR, 2005; P. Dollar, C. Wojek, B. Schiele and P. Perona, "*Pedestrian Detection: An Evaluation of the State of the Art*", PAMI, 2011; D. Geronimo and A. M. Lopez and A. D. Sappa and T Graf "*Survey of Pedestrian Detection for Advanced Driver Assistance Systems*", PAMI, 2010; and M. Enzweiler and D. M. Gavrila. *Monocular Pedestrian Detection: Survey and Experiments. IEEE Transactions on Pattern Analysis and Machine Intelligence*, vol. 31, no. 12, pp. 2179-2195, 2009. In view of the above, there is need to provide a more robust method and system for detecting pedestrians using a single normal camera.

SUMMARY

In one embodiment of the present application, a pedestrian detection method is provided. The method includes: obtaining an image captured by a camera; identifying a pedestrian candidate in the image; transforming the image into a top view image; calculating the actual height of the pedestrian candidate based on the top view image and extrinsic parameters of the camera; and determining whether the pedestrian candidate is a true positive by determining whether the actual height of the pedestrian candidate is within a predetermined pedestrian height range.

In some embodiments, the extrinsic parameters of a camera may include pitch angle $\alpha$, yaw angle $\beta$, and installation height h.

In some embodiments, the image captured by the camera may be transformed into the top view image using intrinsic parameters of the camera, such as focal length $f_u$ and $f_v$, and optical center $c_u$ and $c_v$. In some embodiments, if the lens of the camera is a fish-eye lens, the top view transformation matrix may be:

$$_i^g T = \begin{bmatrix} -\frac{1}{f_u}c_2 & \frac{1}{f_v}s_1 s_2 & -\frac{1}{f_u}c_2 c_u - \frac{1}{f_v}c_v s_1 s_2 - c_1 s_2 \\ \frac{1}{f_u}s_2 & \frac{1}{f_v}s_1 c_1 & -\frac{1}{f_u}c_u s_2 - \frac{1}{f_v}c_v s_1 c_2 - c_1 c_2 \\ 0 & \frac{1}{f_v}c_1 & -\frac{1}{f_v}c_v c_1 - s_1 \end{bmatrix} \quad \text{Equation (1)}$$

where, $c_1$=cos $\alpha$, $s_1$=sin $\alpha$, $c_2$=cos $\beta$, and $s_2$=sin $\beta$. If the camera uses a different lens, the top view transformation matrix may be different.

In some embodiments, the coordinates of a point in a top view image may be calculated by multiplying the coordinates of the point in the image by the top view transformation matrix.

In some embodiments, the method may further include: distortion correcting the image to obtain a corrected image; and transforming the corrected image into the top view image.

In some embodiments, the method may further include: generating an alert if the pedestrian candidate is determined to be a true positive.

In one embodiment of the present application, a pedestrian detection system is provided. The pedestrian detection system includes: an output device; and a processing device configured to: obtain an image captured by a camera; identify a pedestrian candidate in the image; transform the image into a top view image; calculate the actual height of the pedestrian candidate based on the top view image and extrinsic parameters of the camera; determine whether the pedestrian candidate is a true positive by determining whether the actual height of the pedestrian candidate is within a predetermined pedestrian height range; and control the output device to generate an alert if the pedestrian candidate is determined to be a true positive.

In some embodiments, the processing device may be further configured to: distortion correct the image to obtain a corrected image; and transform the corrected image into the top view image.

In some embodiments, the pedestrian detection system may further include the camera.

In one embodiment of the present application, a pedestrian detection system is provided. The pedestrian detection system includes: an output device; and a processing device to: obtain an image captured by a camera; identify a pedestrian candidate in the image; transform the image into a top view image; calculate the actual height of the pedestrian candidate based on the top view image and extrinsic parameters of the camera; determine whether the pedestrian candidate is a true positive by determining whether the actual height of the pedestrian candidate is within a predetermined pedestrian height range; and control the output device to generate an alert if the pedestrian candidate is determined to be a true positive.

In one embodiment of the present application, a pedestrian detection system is provided. The pedestrian detection system includes: a device to identify a pedestrian candidate in an image captured by a camera; a device to transform the image into a top view image; a device to calculate the actual height of the pedestrian candidate based on the top view image and extrinsic parameters of the camera; a device to determine whether the pedestrian candidate is a true positive by determining whether the actual height of the pedestrian candidate is within a predetermined pedestrian height range; and an output device to generate an alert if the pedestrian candidate is determined to be a true positive.

Only a single normal camera is required using the method and system of the present application to detect pedestrians, so the cost of a vehicle mounted pedestrian detection system can be reduced. In addition, the method and system of the present application can be used in existing vehicle models having only one single camera configured to capture images of the view ahead, it is very convenient to add this function in such vehicle models. For example, this function can be added just by updating software of a Driving Assistant System of an existing vehicle model. Furthermore, in the method and system of the present application, motion information is not required, thus the computation complexity can be greatly decreased.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
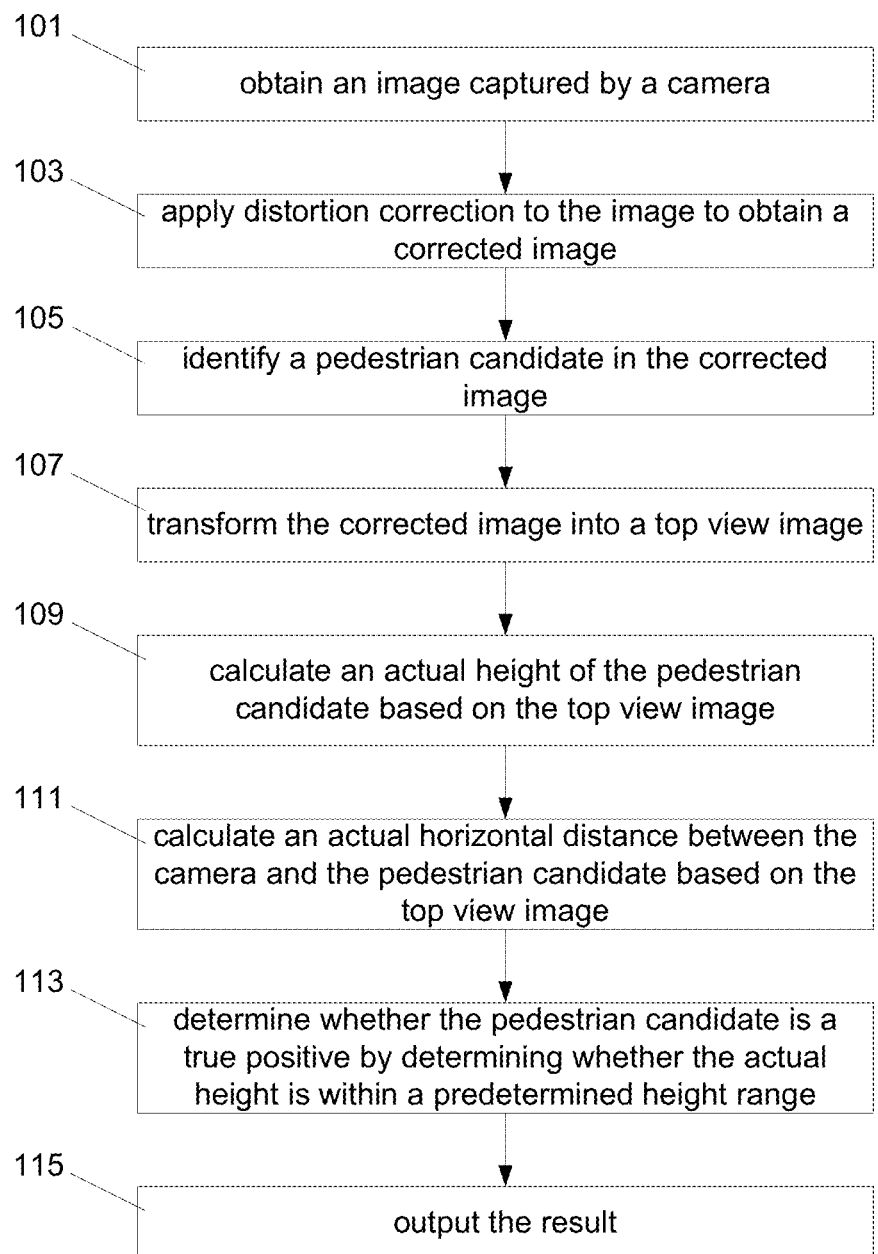
FIG. 1 illustrates a schematic flow chart of a pedestrian detection method 100 according to one embodiment of the present application.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

FIG. 1 illustrates a schematic flow chart of a pedestrian detection method 100 according to one embodiment of the present application.

Figure 2A:
FIG. 2A illustrates an example image captured by a camera.

In 101, obtain an image captured by a camera. FIG. 2A illustrates an example of an image captured by a camera.

Figure 2B:
FIG. 2B illustrates an example image obtained by distortion correcting the image shown in FIG. 2A.

In 103, apply distortion correction to the image captured by the camera to obtain a corrected image. In many cases, an image captured by a camera, especially a wide angle camera, has distortion, and distortion correction may be used to reduce influence of such distortion to subsequent process. Since distortion correction technologies are well known in the art, such technologies will not be described in detail here. FIG. 2B illustrates an example of corrected image obtained by distortion correcting the image shown in FIG. 2A.

In 105, identify a pedestrian candidate in the corrected image. Some examples of such technologies please refer to "*Histograms of Oriented Gradients for Human Detection* by Navneet Dalal and Bill Triggs, IEEE Conference on Computer Vision and Pattern Recognition (CVPR), vol. II, pages 886-893, June 2005"; "*Real-Time Human Detection Using Contour Cues* by Jianxin Wu, Christopher Geyer, and James M. Rehg: Proc. The 2011 IEEE Int'l Conference on Robotics and Automation (ICRA 2011), Shanghai, China, May 2011, pp. 860-867"; and "*Fast Pedestrian Detection Using A Cascade Of Boosted Covariance Features*, In: IEEE Transactions on Circuits and Systems for Video Technology, 2008".

Figure 3A:
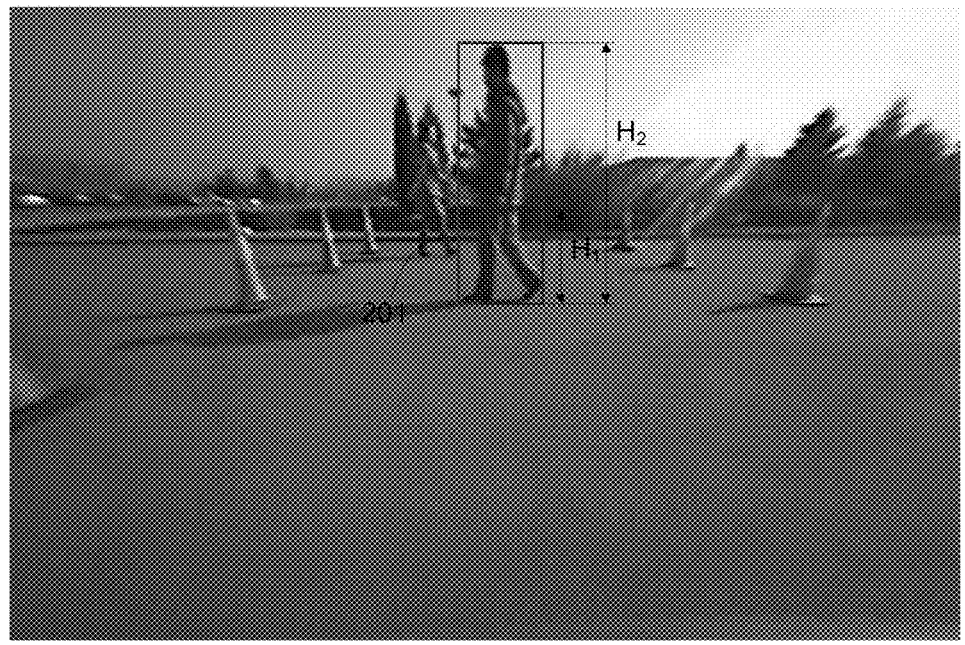
FIG. 3A illustrates that a pedestrian candidate is identified in the corrected image shown in FIG. 2B.

In some algorithms, an identified pedestrian candidate may be enclosed by a rectangle; in some algorithms, an identified pedestrian candidate may be enclosed by an oval. FIG. 3A illustrates an example of an image in which a pedestrian candidate is identified and enclosed by a rectangle 201.

Figure 3B:
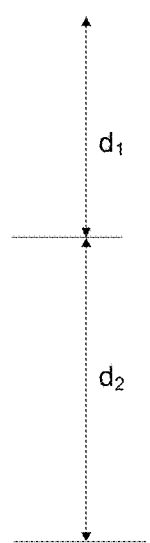
FIG. 3B illustrates a top view image transformed from the corrected image shown in FIG. 2B.

In 107, transform the corrected image into a top view image. FIG. 3B illustrates an example of top view image transformed from the image shown in FIG. 3A. As one can see that only a part of the pedestrian candidate is contained in the top view image shown in FIG. 3B, and this part will be referred as the segmented part hereinafter. How to transform an image into a top view image is well known in the art, and it will not be described in detail here.

Figure 4:
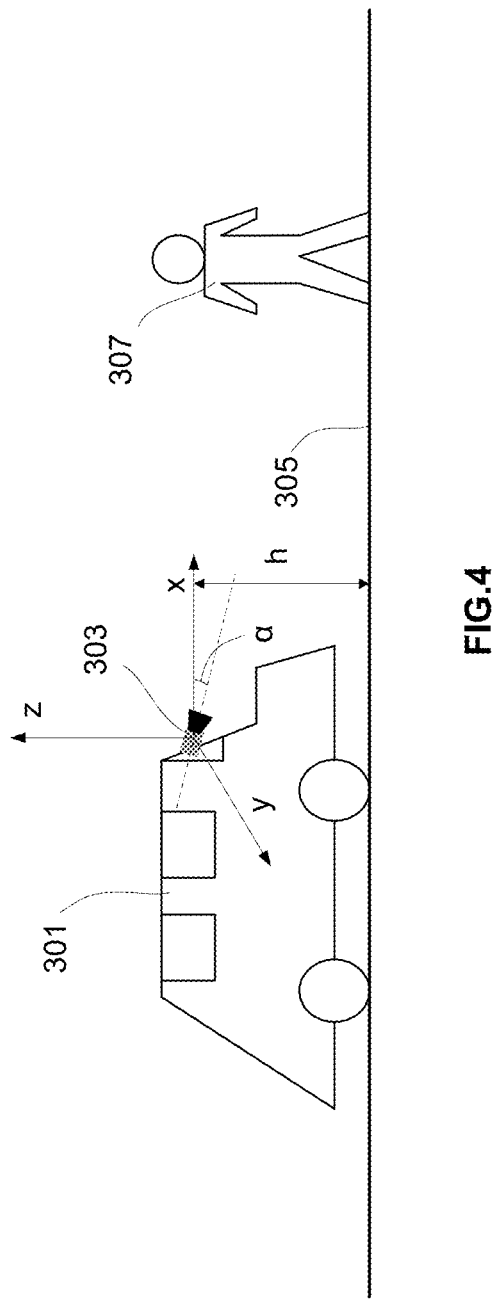
FIG. 4 illustrates a schematic diagram of a vehicle and a pedestrian.

FIG. 4 illustrates a vehicle 301 having a camera 303 mounted thereon running on a road surface 305, and a pedestrian 307 in front of the vehicle 301. In an illustrative embodiment shown in FIG. 4, the pitch angle of the camera 303 is a, the yaw angle of the camera 303 equals to zero, and the installation height of the camera 303 is h. For convenience sake, the yaw angle of the camera 303 is set as zero in this embodiment. If the yaw angle does not equal to zero, the subsequent computation may be more complicated. A pitch angle of a camera is an angle between x axis and the projection of the principal axis of the camera on the plane defined by x axis and z axis. A yaw angle of a camera is an angle between x axis and the projection of the principal axis of the camera on the plane defined by x axis and y axis.

Figure 5:
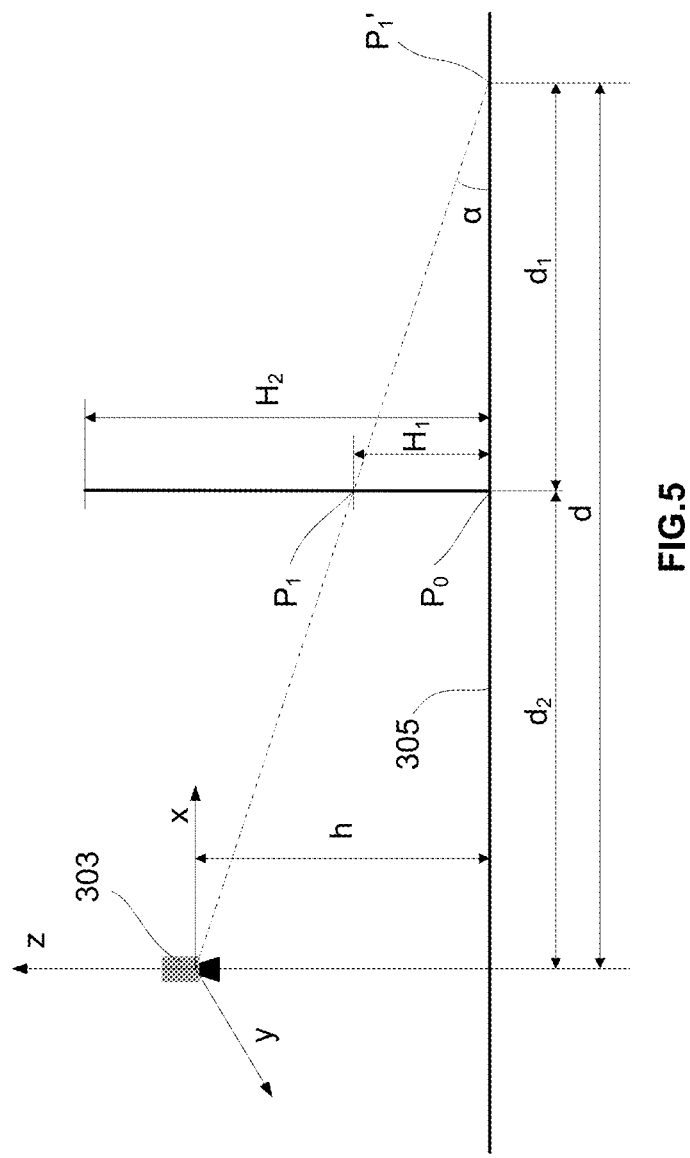
FIG. 5 illustrates a schematic diagram of how to calculate the actual height of a pedestrian candidate.

In 109, calculate an actual height of the pedestrian candidate based on the top view image and the extrinsic parameters of the camera 303. FIG. 5 illustrates the relationship between various dimensions. In FIG. 5, the installation height h and the pitch angle α of the camera 303 are known. As a result, d can be calculated according to Equation (1).

$$d = \frac{h}{\tan \alpha} \qquad \text{Equation (1)}$$

Referring back to FIG. 3B, the relationship between $d_1$ and $d_2$ can be calculated. In other words, the ratio $r_1=d_2/d_1$ can be calculated. $d_1$ represents the actual dimension of the projection of the segmented part on the road surface 305, and $d_2$ represents the actual horizontal distance between the camera 303 and the pedestrian candidate. Then $d_1$ can be calculated according to Equation (2).

$$d_1 = \frac{d}{1+r_1} \qquad \text{Equation (2)}$$

After $d_1$ is calculated, the actual height of the segmented part $H_1$ can be calculated according to Equation (3).

$$H_1 = d_1 \times \tan\alpha \qquad \text{Equation (3)}$$

According to the top view transforming algorithm, the ratio $r_2=H_1/H_2$ can be calculated, thus the actual height of the pedestrian $H_2$ can be calculated according to Equation (4).

$$H_2 = \frac{H_1}{r_2} \qquad \text{Equation (4)}$$

In 111, calculate the actual horizontal distance between the camera and the pedestrian candidate. $d_2$ represents the actual horizontal distance between the camera and the pedestrian candidate. Since the ratio $r_1=d_2/d_1$ and $d_1$ are known, $d_2$ can be calculated according to Equation (5).

$$d_2 = d_1 \times r_2 \qquad \text{Equation (5)}$$

According to the above embodiment, the actual height of the pedestrian candidate $H_2$ is calculated based on the ratio $r_1$ of $d_2$ to $d_1$ and extrinsic parameters of the camera. In other words, the actual height of the pedestrian candidate $H_2$ is calculated based on the position of the pedestrian candidate in the top view image and extrinsic parameters of the camera.

In 113, determine whether the pedestrian candidate is a true positive by determining whether the actual height of the pedestrian candidate is within a predetermined height range. If the actual height of the pedestrian candidate is out of the height range, then the pedestrian candidate may be determined as a false positive, otherwise the pedestrian candidate may be determined as true positive. In one embodiment, the height range may be from 1 meter to 2.4 meters. The lower limit and the upper limit of the height range may be set according to specific situation. For example, for Asia area, the lower limit and the upper limit may be set lower, and for Europe area, the lower limit and the upper limit may be set higher. For example, the lower limit may be 0.8 meter, 0.9 meter, 1.1 meters, or 1.2 meters; the upper limit may be 2 meters, 2.1 meters, 2.2 meters, 2.3 meters, 2.5 meters. The above numbers are only for illustrative purpose, and are not intended to be limiting.

Figure 6:
FIG. 6 illustrates an example image in which a detection result is presented.

In 115, output the result. When a pedestrian is detected, a notice may be presented to a user such as a driver. In some embodiments, a detected pedestrian may be enclosed by a rectangle in the image, and the actual distance between the camera and the detected pedestrian may also be provided in the image as shown in FIG. 6. In some embodiments, a sound alert may be generated when a pedestrian is detected.

Figure 7:
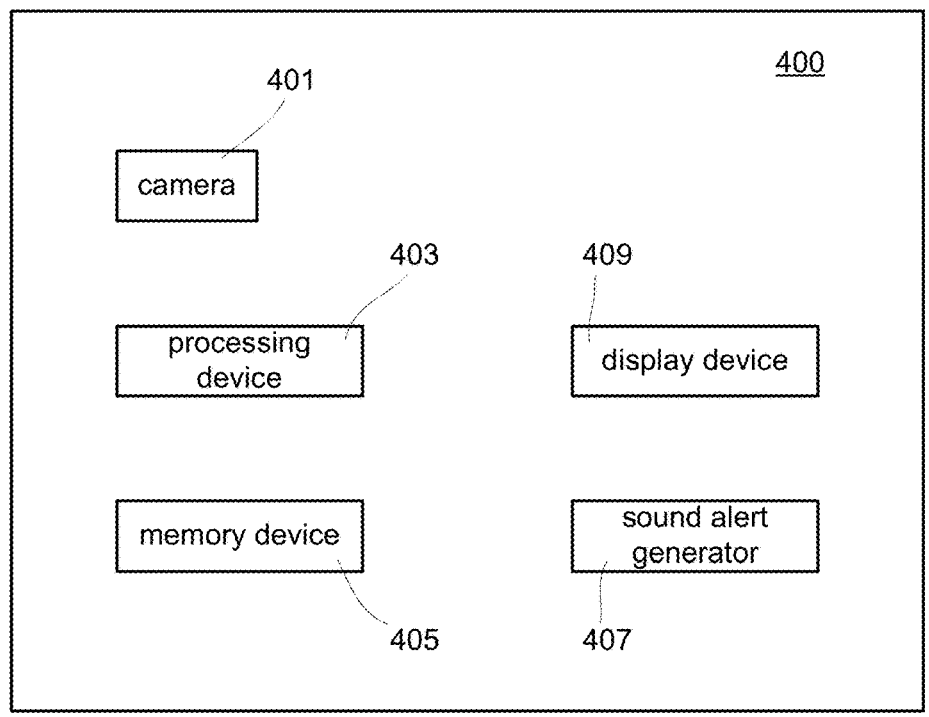
FIG. 7 illustrates a schematic block diagram of a system for detecting pedestrians according to one embodiment of the present application.

FIG. 7 illustrates a system 400 for detecting pedestrian. The system 400 includes a camera 401, a processing device 403, a memory device 405, a sound alert generator 407, and a display device 409. The system 400 may be mounted on a vehicle to detect and remind a driver of pedestrians in the vicinity of the vehicle.

The camera 401 is to capture images. The processing device 403 may be configured to conduct 103 to 113 of the method 100. The memory device 405 may store an operating system and program instructions therein.

When a pedestrian is detected, the processing device 403 may send an instruction to control the sound alert generator 407 to generate a sound alert, may control the display device 409 to present the detected pedestrian by enclosing the pedestrian in a rectangle in the image, and may control the display device 409 to present the actual distance between the detected pedestrian and the camera 401. In some embodiments, the actual distance between the detected pedestrian and the vehicle on which the system 400 is mounted may be calculated and presented on the display device 409.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A pedestrian detection method comprising:
    obtaining an image captured by a camera;
    identifying a pedestrian candidate in the image;
    transforming the image into a top view image;
    calculating an actual height of the pedestrian candidate based on the top view image and extrinsic parameters of the camera, the actual height of the pedestrian candidate comprising a full height of the pedestrian candidate extending from a head of the pedestrian candidate to a foot of the pedestrian candidate; and
    determining whether the pedestrian candidate is a true positive by determining whether the actual height of the pedestrian candidate is within a predetermined pedestrian height range from a first height to a second height.

2. The method of claim 1, wherein the extrinsic parameters of the camera comprise pitch angle $\alpha$, yaw angle $\beta$, and installation height h.

3. The method of claim 1, further comprising: distortion correcting the image to obtain a corrected image; and transforming the corrected image into the top view image.

4. The method of claim 1, further comprising: generating an alert if the pedestrian candidate is determined to be a true positive.

5. The method of claim 1, wherein the first height of the predetermined pedestrian height range is 1 meter and wherein the second height of the predetermined pedestrian height range is 2.4 meters.

6. A pedestrian detection system comprising:
    an output device; and
    a processing device configured to: obtain an image captured by a camera; identify a pedestrian candidate in the image; transform the image into a top view image; calculate an actual height of the pedestrian candidate based on the top view image and extrinsic parameters of the camera; determine whether the pedestrian candidate is a true positive by determining whether the actual height of the pedestrian candidate is within a predetermined pedestrian height range, the predetermined pedestrian height range including a non-zero lower limit and a non-zero upper limit that is different from the non-zero lower limit; and control the output device to generate an alert if the pedestrian candidate is determined to be a true positive.

7. The system of claim 6, wherein the extrinsic parameters of the camera comprise pitch angle $\alpha$, yaw angle $\beta$, and installation height h.

8. The system of claim 6, further comprising the camera.

9. The system of claim 6, wherein the processing device is further configured to:
distortion correct the image to obtain a corrected image; and transform the corrected image into the top view image.

10. The system of claim 6, wherein the predetermined pedestrian height range is from 1 meter to 2.4 meters.

11. The method of claim 4, wherein the alert is a sound alert, and wherein the extrinsic parameters of the camera comprise pitch angle $\alpha$, yaw angle $\beta$, and installation height h.

12. The method of claim 11, further comprising: distortion correcting the image to obtain a corrected image; and transforming the corrected image into the top view image.

13. The method of claim 1, further comprising presenting the true positive detected pedestrian to a vehicle driver via a display device in a vehicle by enclosing the pedestrian in the image.

14. The method of claim 13, further comprising controlling the display device to present a distance between the true positive detected pedestrian and the camera.

15. The method of claim 14, wherein the pedestrian is enclosed with a rectangle on the display device.

16. The system of claim 6, further comprising the camera, wherein the processing device is further configured to: distortion correct the image to obtain a corrected image; and transform the corrected image into the top view image.

17. The system of claim 16, wherein the predetermined pedestrian height range is from 1 meter to 2.4 meters, and wherein the alert is a sound alert.

18. The system of claim 6, further comprising a display device, wherein the processing device is further configured to present the true positive detected pedestrian to a vehicle driver via the display device in a vehicle by enclosing the pedestrian in the image.

19. The system of claim 18, wherein the processing device is further configured to control the display device to present a distance between the true positive detected pedestrian and the camera.

20. The system of claim 19, wherein the pedestrian is enclosed with a rectangle on the display device.

\* \* \* \* \*